US012539339B2

(12) United States Patent
Nandi et al.

(10) Patent No.: US 12,539,339 B2
(45) Date of Patent: Feb. 3, 2026

(54) RADIOPHARMACEUTICAL CONJUGATE COMPOUND FOR DIAGNOSIS AND/OR THERAPEUTIC USES THEREOF

(71) Applicant: Jubilant Draximage Inc., Montreal (CA)

(72) Inventors: Indranil Nandi, Yardley, PA (US); Vijayaraj Kuniyil Kulangara, Montreal (CA); Miriam Ruiz Pena, Kirkland (CA); Aida Mary Abreu Diaz, Kirkland (CA); Sara Elkashef, Kirkland (CA)

(73) Assignee: Jubilant Draximage Inc. (IN)

( * ) Notice: Subject to any disclaimer, the term of this patent is extended or adjusted under 35 U.S.C. 154(b) by 22 days.

(21) Appl. No.: 18/614,094

(22) Filed: Mar. 22, 2024

(65) Prior Publication Data

US 2024/0316226 A1 Sep. 26, 2024

Related U.S. Application Data

(60) Provisional application No. 63/492,153, filed on Mar. 24, 2023, provisional application No. 63/492,172, filed on Mar. 24, 2023.

(51) Int. Cl.
*A61K 51/08* (2006.01)
*A61K 51/12* (2006.01)

(52) U.S. Cl.
CPC ........ *A61K 51/088* (2013.01); *A61K 51/1244* (2013.01)

(58) Field of Classification Search
CPC .......................... A61K 51/088; A61K 51/1244
See application file for complete search history.

(56) References Cited

U.S. PATENT DOCUMENTS 5,428,156 A * 6/1995 Mease .................. C07D 257/02 540/474
10,398,791 B2 * 9/2019 Eder ..................... C07B 59/002
2013/0330276 A1 * 12/2013 Caviglioli ............ A61K 51/088 424/1.69

OTHER PUBLICATIONS

Cristina Muller et al. DOTA Conjugate with an Albumin-Binding Entity Enables the First Folic Acid-Targeted 177Lu-Radionuclide Tumor Therapy in Mice, J. Nucl Med, 54, 124-131). (Year: 2013).*
Waralee Watcharin et al. Detection of hepatocellular carcinoma in transgenic mice by Gd-DTPA- and rhodamine 123-conjugated human serum albumin nanoparticles in T1 magnetic resonance imaging, J Control Release, 199, 63-71. (Year: 2015).*
Javad Garousi et al. Radionuclide therapy using ABD—fused ADAPT scaffold protein: Proof of Principe, Biomaterial, 266, 120381. (Year: 2021).*
Azade Taheri et al., Nanoparticles of Conjugated Methotrexate-Human Serum Albumin: Preparation and Cytotoxicity Evaluations, J Nanomaterials, Article ID 768201, 7 pages. (Year: 2011).*
Liangke Zhang et al., Uptake of folate-conjugated albumin nanoparticles to the SKOV3 cells, Int. J Pharmaceutics, 287, 155-162. (Year: 2004).*
Javad Garousi et al. Radionuclide therapy using ABD—fused ADAPT scaffold protein: Proof of Principle, Biomaterial, 266, 120381. (Year: 2021).*
Waralee Watcharin et al. Detection of hepatocellular carcinoma in transgenic mice by Gd-DTPA- and rhodamine 123-conjugated human serum albumin nanoparticles in T1 magnetic resonance imaging, J Cont Release, 199,63-71. (Year: 2015).*

* cited by examiner

*Primary Examiner* — Michael G. Hartley
*Assistant Examiner* — Jagadishwar R Samala
(74) *Attorney, Agent, or Firm* — William D. Hare, Esq.; McNeely, Hare & War, LLP

(57) ABSTRACT

The present invention provides a conjugate compound comprising a nanoparticulated enhanced permeability and retention (EPR) agent, which is an albumin, conjugated with one or more chelating agents, one or more target specific ligands and one or more detectable agents and optionally comprising one or more heterobifunctional crosslinkers and one or more pharmaceutically acceptable therapeutic agents. Further, the present invention provides a radiopharmaceutical composition and a kit comprising the said conjugate and also provides application of the same in diagnosis and therapy of various disease like cancer.

6 Claims, 5 Drawing Sheets

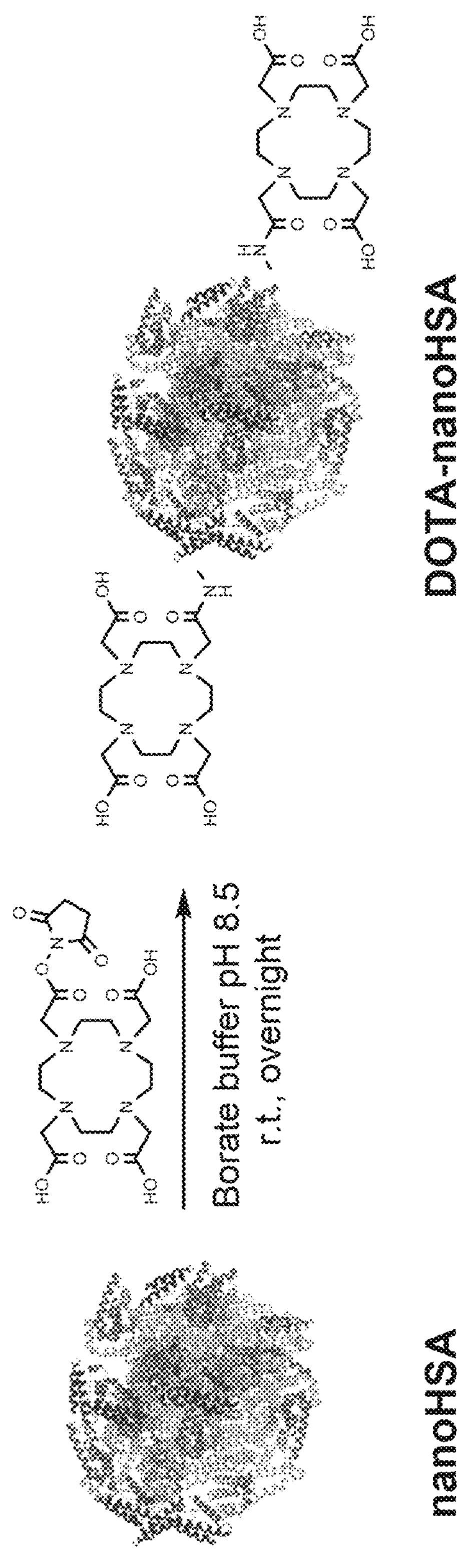
FIG. 1. Conjugation of nanoHSA with DOTA chelator

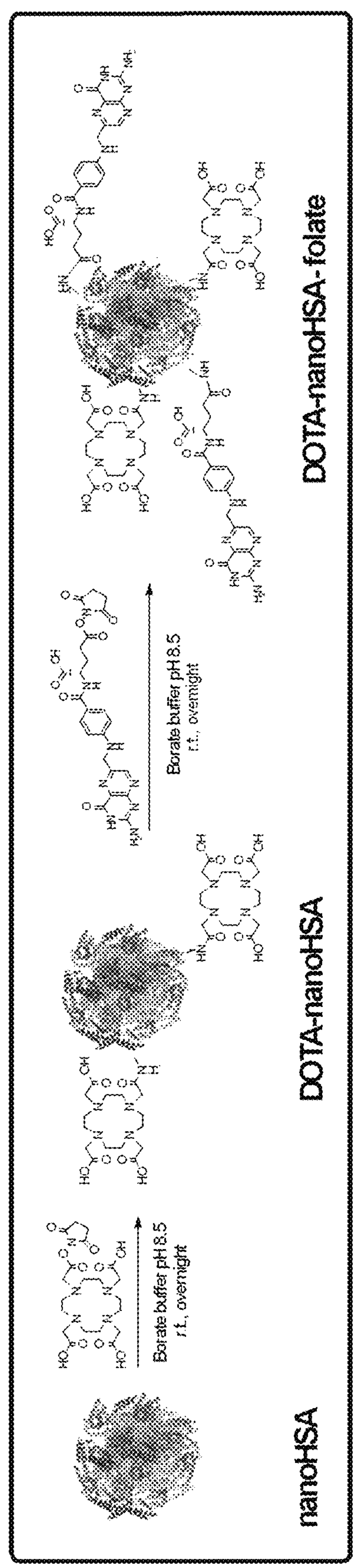
FIG. 2. Conjugation of folate with nanoHSA-DOTA

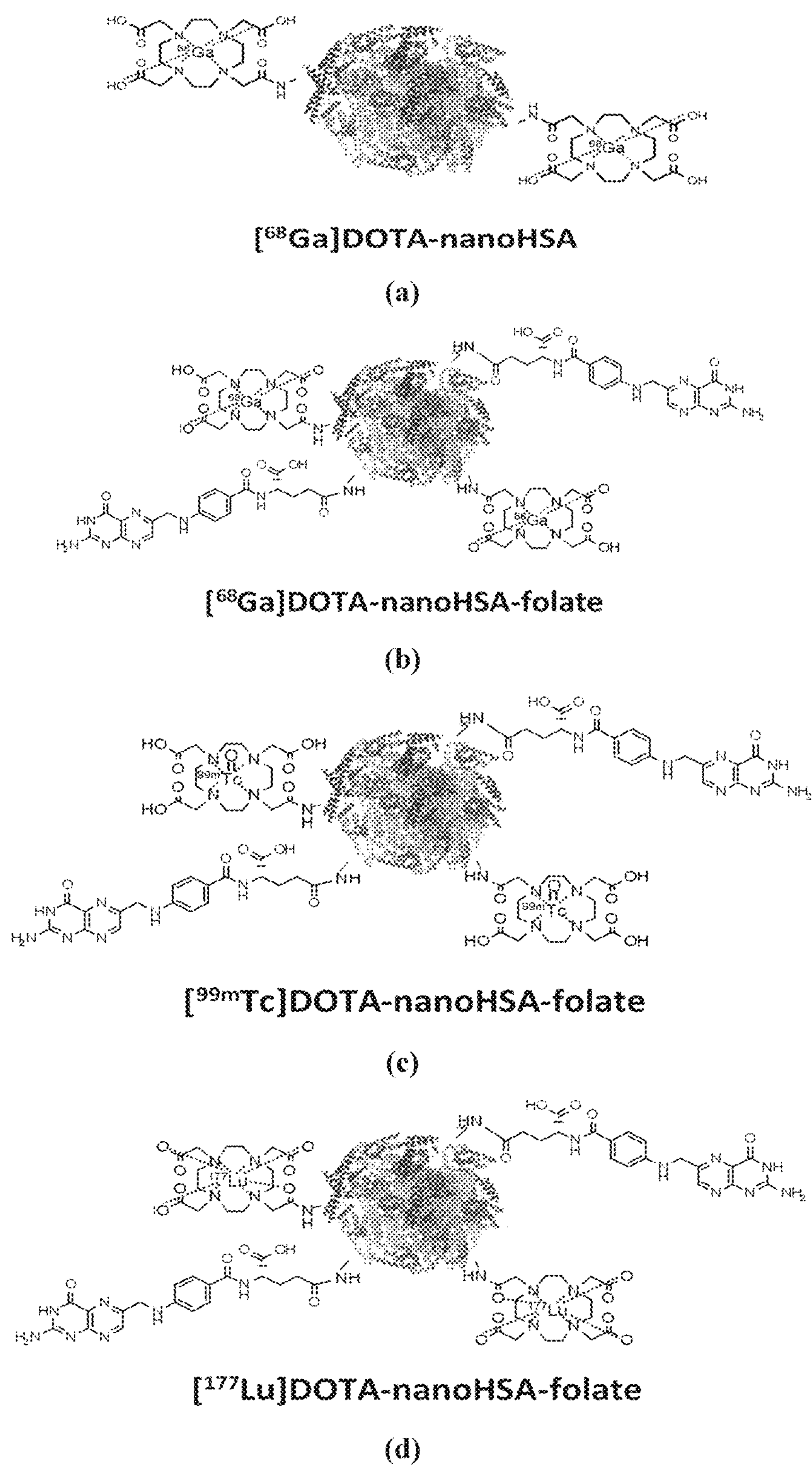
FIG. 3. Chemical Structures of the nanoHSA conjugates

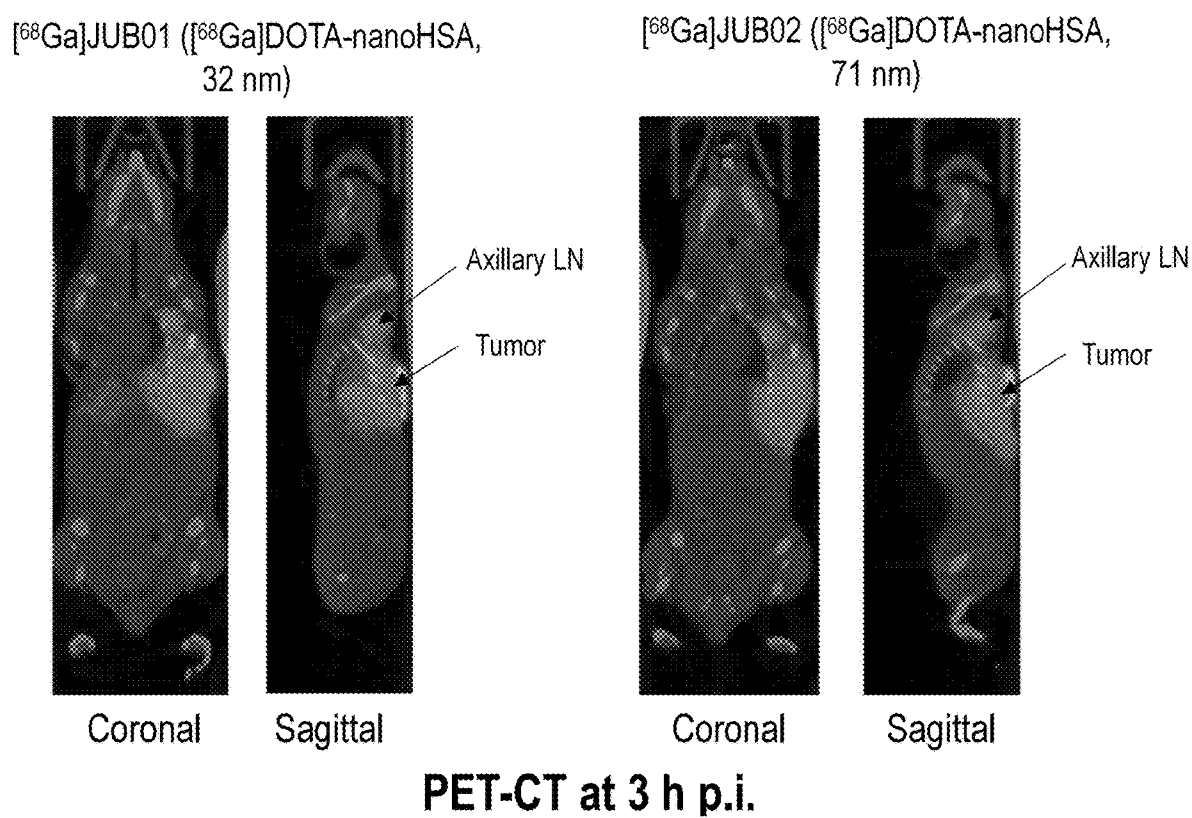
FIG. 4. Representative SPECT-CT and PET-CT images acquired at 3 hours post tracer injection

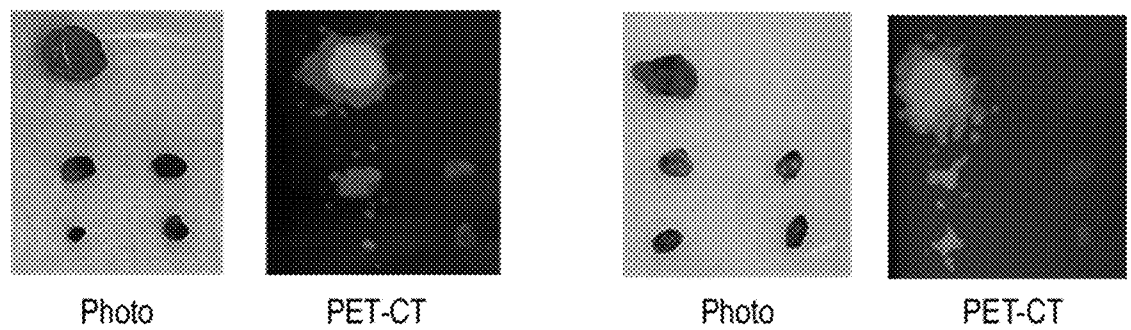
Ex vivo Imaging Scheme
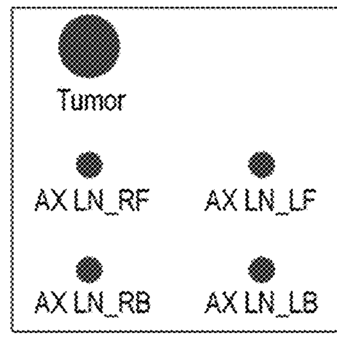
AX LN: Axillary Lymph Node
R: Right side (Tumor side)
L: Left side (Contralateral side)
F: Front
B: Back
FIG. 5. Results of ex-vivo imaging studies

RADIOPHARMACEUTICAL CONJUGATE COMPOUND FOR DIAGNOSIS AND/OR THERAPEUTIC USES THEREOF

REFERENCE TO RELATED APPLICATIONS

This application claims the benefit of U.S. Provisional Application No. 63/492,153, filed on Mar. 24, 2023 and U.S. Provisional Application No. 63/492,172, filed on Mar. 24, 2023, both of which are incorporated herein by reference.

FIELD OF THE INVENTION

The present invention relates to a radiopharmaceutical conjugate compound comprising an enhanced permeability and retention (EPR) agent bound with a chelating agent and optionally a target specific ligand or drug, which is used for diagnostic and/or therapeutic purposes. In particular, the present invention relates to a nanoparticulate conjugate comprising an enhanced permeability and retention (EPR) agent like albumin bound with a chelating agent, a detectable agent, and optionally one or more target specific ligands or drugs, which is used for diagnostic and/or therapeutic purposes.

BACKGROUND OF THE INVENTION

Timely and detailed diagnosis of any disease is important in effective treatment planning. Nuclear medicine plays an important role in this aspect by facilitating diagnosis and/or treatment of various diseases using radioactive materials. With the help of nuclear medicine and radiotherapy, various screening and advanced diagnostic techniques have been developed for an early detection of diseases and improved survival rates. For an early diagnosis of disease, scintigraphy is one of the promising methods in nuclear medicine to diagnose problems in the thyroid gland, liver, spleen, stomach and intestines, kidneys, gall bladder, heart, lungs, ovary, veins and bones and facilitates early detection of diseases.

Cancer is one of the leading causes of mortality and morbidity around the world. There are several types of cancer like metastatic breast cancer, lung cancer, pancreatic cancer, prostate cancer, lymphatic cancer, thyroid gland cancer, neuroendocrine tumors (NETs), renal cancer, ovarian cancer, and cervical cancer. Incidences of cancer and mortality associated with the same is on the rise in recent times. Early diagnosis of cancer in many cases remains challenging. Importantly, ovarian cancers are usually detected at advanced stages, resulting in high mortality. Pancreatic cancer, similarly, is a slowly progressing disease and difficult to detect at an early stage. Early diagnosis is challenging in lung, prostate, thyroid and lymphatic cancers as well and mostly are not diagnosed until at an advanced stage.

At present, there are no reliable tests to screen for the early stage detection of various cancers, causing a very high mortality rate. Currently used methods of screening such as physical examination like pelvic, abdominal, breast, digital rectal and lymph nodes areas palpation; ultrasound for abdominal, breast, transvaginal or transrectal exam; sputum cytology; and serum biomarkers, all lack accuracy of detection and characterization of cancer. Conventionally, antibody and antigen tests are widely used, but these tests can lack specificity. Techniques like bronchoscopy, endoscopy, pancreatic angiography, and tumor tissue or bone marrow biopsies taken for histology or immunohistochemistry or flow cytometry are invasive and may prove inadequate to represent the whole malignancy as well as difficult in acquiring suitable tissues. Imaging techniques such as X-rays, computed tomography (CT) and Magnetic Resonance Imaging (MRI) may show signs of cancer, but these are also not sensitive or accurate at times. Hence, to plan treatment and surgical procedures, techniques like Single-Photon Emission Computed Tomography (SPECT) or Positron Emission Tomography (PET) imaging have advantages. However, the widely used [F-18]Fluorodeoxyglucose ([F-18]FDG) PET technique may have poor diagnosis and false positive results. In case of chemotherapy, rapid emergence of resistance to chemotherapy and higher hematologic toxicity are other major areas of concern.

The Enhanced Permeability and Retention Effect (EPR effect) is a universal pathophysiological phenomenon and mechanism in which macromolecular compounds such as albumin and other polymeric molecules beyond certain sizes (above 40 kDa) can accumulate in solid tumors and aid in achieving targeted delivery of diagnostic and therapeutic agents.

Albumin nanoparticles like Albumin-bound paclitaxel (nab-PTX, Abraxane®) have been clinically used for targeted delivery of chemotherapeutic agents.

Nanoparticles of Human Serum Albumin (HSA) labelled with $^{99m}$Tc are used in Nuclear Medicine in lymphoscintigraphy for the detection of the sentinel lymph node (SLN) in many kinds of cancer. However, there are technical and clinical challenges in designing new HSA based nanoparticles.

PCT patent publication no. 2011033112, discloses the preparation of $^{68}$Ga-NOTA-HSA. It states that NOTA is preferable to DOTA for $^{68}$Ga-labeling as it does not require high themperature for radiolabeling reaction. It further discloses macroaggregated $^{68}$Ga-NOTA-HSA conjugates and demonstrates the use of the same for lung imaging.

Caviglioli et al. (Sci Rep 9; 2019; 5623) discloses $^{68}$Ga-labeled conjugates of human serum albumin with the chelating agent p-SCN-Bn-DOTA. The conjugates prepared were macroaggregates with a size range of 4 μm to 44 μm and after labeling with gallium-68 were used for imaging of breast cancer lesions. HSA conjugation with the chelating agent p-SCN-Bn-DOTA was conducted at pH 9 at 40° C. with 16 hrs stirring. Under the same reaction conditions, DOTA conjugate with HSA was not obtained.

Accordingly, there is an unmet need for clinically practiceable PET blood pool imaging and lymphatic imaging agents. More particularly, there remains a need to study the complex lymphatic system and provide an imaging method and treatment plan for lymph node metastasis. Further, there is a need to provide an imaging agent with a better pharmacokinetic profile and enhanced permeability and retention (EPR) in solid tumors. The present invention provides a nanoparticulate radioconjugate of albumin and a radiopharmaceutical kit comprising the same and which can provide a synergistic and advantageous effect on the treatment and/or diagnosis of various diseases.

SUMMARY OF THE INVENTION

The present invention relates to a radiopharmaceutical conjugate compound comprising an enhanced permeability and retention (EPR) agent bound with one or more chelating agents, and which is suitable to be used for diagnostic and/or therapeutic purposes. In particular, the present invention relates to a nanoparticulate conjugate compound comprising an EPR agent bound with chelating agent and detectable agent, and which is suitable to be used for diagnostic and/or therapeutic purposes, and wherein the EPR agent is albumin.

An aspect of the present invention relates to a nanoparticulated albumin based conjugate, which can be labeled with PET or SPECT radioisotopes, with desirable pharmacokinetics, and image quality to facilitate blood-pool, vascular permeability, and lymphatic imaging. The conjugate compound particularly can be useful in PET/SPECT imaging of sentinel lymph nodes (SLNs) for SLNs biopsy and/or diagnosis of breast cancer metastasis.

Particularly, the present invention relates to a nanoconjugate compound that comprises a nanoaggregated HSA conjugated with a chelating agent labeled with a diagnostic or therapeutic radioisotope. The particle size of the nanoconjugate compound is in the range of 5 nm-200 nm. As described in more detail herein, the particle size can be measured by a number of techniques and associated analytical equipment. The particle size in case of nanoparticles generally refers to the particle size obtained by Dynamic Light Scattering Method by analysing the intensity fluctuations in the scattered light. It should be understood that the terms conjugate compound and nanoconjugate compound may be used interchangeably herein to refer to a compound having a particle size in the range of 5-200 nm.

An aspect of the present invention relates to a nanoconjugate compound comprising nanoaggregated HSA conjugated with a chelating agent, further comprising a target specific ligand and labeled with a diagnostic or therapeutic radioisotope wherein the particle size of the nanoconjugate is in the range of 5 nm-200 nm.

An aspect of the present invention relates to a nanoconjugate compound comprising nanoaggregated HSA conjugated with a chelating agent, further comprising a target specific ligand, a heterobifunctional cross-linker and a pharmaceutically acceptable therapeutic agent and labeled with a diagnostic or therapeutic radioisotope wherein the particle size of the nanoconjugate is in the range of 5 nm-200 nm.

An aspect of the present invention also relates to a process of preparation of the nanoparticlated albumin based conjugate comprising albumin, one or more target specific ligands, one or more chelating agents and one or more diagnostic or therapeutic radionuclides.

In one aspect, the present invention provides a conjugate compound comprising of the following formula:

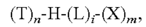

$(T)_n$-H-$(L)_i$-$(X)_m$, wherein:

i) T denotes a target specific ligand;

ii) H is an EPR agent;

iii) L denotes a chelating agent; and iv) X denotes a radioisotope or a detectable agent;

wherein n and i both are integers of value 0-5 and m is an integer of value 1-5; and wherein the EPR agent is albumin; and wherein the conjugate compound further optionally comprises one or more heterobifunctional crosslinker and/or one or more pharmaceutically acceptable therapeutic agents; and wherein the said conjugate compound has a particle size of from about 5 nm to about 200 nm.

In another aspect the present invention provides the conjugate compound wherein the radioisotope is selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-214, lead-212, rhenium-188, rhenium-186, and/or combinations thereof.

In another aspect the present invention provides the conjugate compound wherein the one or more chelating agents are selected from the group consisting of 2,2',2",2'''-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis (carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof.

In another aspect the present invention provides the conjugate compound wherein the one or more target specific ligands are selected from the group consisting of folate receptor targeted agents, HER 2 antibody, PSMA binding ligands, FAPα inhibitors, GRPR inhibitors, PD-1 inhibitors and PD-L1 inhibitors, PARP inhibitors (PARPi), somatostatin receptor antagonists and/or combinations thereof.

In another aspect the present invention provides the conjugate compound wherein the one or more heterobifunctional crosslinkers are selected from the group consisting of succinimidyl 4-(N-maleimidomethyl)cyclohexane-1-carboxylate (SMCC and/or MCC), m-maleimidobenzoyl-N-hydroxysuccinimide ester (MBS), N-(beta-maleimidopropyloxy)succinimide ester (BMPS), N-[e-maleimidocaproyloxy]succinimide ester (EMCS), N-[gamma-maleimidobutyryloxy]succinimide (GMBS), N-succinimidyl 4-[4-maleimidophenyl]butyrate (SMPB), succinimidyl-6-(β-maleimidopropionamido)hexanoate (SMPH), and maleimide-polyethylene glycol-N-hydroxysuccinimide ester (MAL-PEG-NHS) and/or combinations thereof.

In another aspect the present invention provides the conjugate compound wherein the one or more pharmaceutically acceptable therapeutic agents are selected from the group consisting of Cabazitaxel, Docetaxel, Nab-paclitaxel, Paclitaxel; Vinblastine, Prednisone, Methylprednisolone, Dexamethasone, Daunorubicin, Epirubicin, Idarubicin, Valrubicin, Gemcitabine, Methotrexate, Pralatrexate, Azacitidine, 5-fluorouracil (5-FU), 6-mercaptopurine (6-MP), Capecitabine, Cladribine, Clofarabine, Cytarabine, Decitabine, Floxuridine, Fludarabine, Carmustine, Lomustine, Streptozocin, Cisplatin, Cyclophosphamide, Dacarbazine, Ifosfamide, Mechlorethamine, Melphalan, Oxaliplatin, Temozolomide, Thiotepa, Altretamine, Bendamustine, Busulfan, Carboplatin and combinations thereof.

In another aspect the present invention provides a method of diagnosis and/or treatment of ovarian cancer, breast cancer, prostate cancer, thyroid cancer, neuroendocrine tumors (NETs), pancreatic cancer, non-small cell lung cancer (NSCLC), and/or combinations thereof, using the conjugate compounds disclosed herein.

In another aspect the present invention provides, a conjugate compound comprising of the following formula:

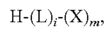

$H\text{-}(L)_i\text{-}(X)_m$, wherein:

i) H is albumin;

ii) L is a chelating agent selected from the group consisting of 2,2',2",2'"-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis(carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof; and iii) X is a radioisotope selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-212, rhenium-188, rhenium-186, and/or combinations thereof; and wherein i is an integer of value 0-5 and m is an integer of 1-5; and wherein the said conjugate compound has a particle size of from about 5 nm to about 200 nm; and wherein the conjugate compound can further optionally comprise one or more target specific ligands.

In another aspect of the present invention, the albumin can be selected from the group consisting of human serum albumin (HSA), bovine serum albumin (BSA), recombinant albumin, recombinant human albumin, ovalbumin, alpha lactalbumin and/or combinations thereof.

In another aspect of the present invention, the conjugate compound has an initial radiochemical purity of at least 80% for at least 3 hours at room temperature.

In another aspect of the present invention, the conjugate compound has a polydispersity index less than 0.5.

In another aspect, the present invention provides a method of imaging sentinel lymph nodes using the conjugate compound of the invention.

In another aspect, the present invention provides a method of diagnosis and/or treatment of epithelial ovarian cancer using the conjugate compound.

In another aspect, the present invention provides a conjugate compound comprising of the following formula:

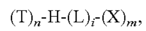

$(T)_n\text{-}H\text{-}(L)_i\text{-}(X)_m$, wherein:

i) T denotes a folate targeted ligand;

ii) H is albumin;

iii) L is a chelating agent selected from the group consisting of 2,2',2",2'"-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis(carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof; and iv) X is a radioisotope selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-212, rhenium-188, rhenium-186, and/or combinations thereof;

wherein n and m both are integers of value 1-5 and i is an integer of value 0-5; and wherein the said conjugate compound has a particle size of from about 5 nm to about 200 nm.

In another aspect of the present invention, the folate targeted ligand can be selected from the group consisting of folic acid (and derivatives) and folate salts (and derivatives) including tetrahydrofolate, 5-formyltetrahydrofolate, 5,10-methylenetetrahydrofolate, 5-methyltetrahydrofolate, FBA-γ-folate, fluoro-benzene-carbohydrazide-folate, fluoro-pyridine-carbohydrazide-folate, methotrexate, fluoro-pyridine-carbohydrazide-methotrexate, fluoro-deoxy-glucose-folate, and 3'-aza-2'-fluorofolic acid.

In another aspect, present invention provides a method of regional lymph node treatment post tumor surgery, using the conjugate compound.

In another aspect, the present invention provides a method of treatment of epithelial ovarian cancer using the conjugate compound.

According to another aspect, the conjugate compound of the present invention is used in lymphoscintigraphy or lymphatic imaging and the conjugate compound has a particle size of about 5 nm to about 200 nm.

According to another aspect, the conjugate compound of the present invention is used in the treatment of cancers and the conjugate compound has a particle size of about 5 nm to about 200 nm.

According to another aspect, the conjugate compound of the present invention is prepared by a process comprising the following steps:

i) dissolving lyophilized albumin nanocolloid (nanoalbumin) in an aqueous buffer of pH of about 8.5;

ii) adding a chelating agent pre-dissolved in the same buffer of step i);

iii) stirring the mixture for 8-12 hours at room temperature (about 20-25° C.);

iv) purifying the conjugate product by size exclusion chromatography to provide a nanoalbumin conjugated with the chelating agent;

v) lyophilizing the nanoalbumin conjugated with the chelating agent from step iv); and vi) radiolabeling with a radioisotope selected from the group consisting of copper-64, copper-67, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-212, rhenium-188, rhenium-186.

According to another aspect, the conjugate compound of the present invention comprises nanoalbumin that is obtained through controlled aggregation of an aqueous albumin solution under basic pH (8 to 12, preferably 9.5-10.5) and controlled heating (from room temperature (about 20-25° C.) to a maximum temperature of 90° C. (preferably to 75-85° C.) in 15-45 minutes) in a bioreactor.

According to another aspect, the conjugate compound of the present invention is radiolabeled with gallium-68 through a process comprising the following steps:

i) eluting 0.1N HCl elution solution from a commercially available Ge-68/Ga-68 generator and collecting the eluate;

ii) adding the radioactive eluate of step i) to a vial containing lyophilized nanoalbumin conjugate;

iii) adding a buffer of pH 3.5-5.0 in the vial of step ii);

iv) transferring the vial of step iii) to the pre-heated heater for the radiolabeling over about 5-30 minutes at a temperature of about 60-90° C., preferably between 70° C. and 80° C. and cooling for about 1-20 minutes; and v) diluting the vial containing the radiolabeled product of step iv) with a saline solution to the desired volume.

According to another aspect, the conjugate compound of the present invention is radiolabeled with lutetium-177 comprising the steps of:

i) adding HCl 0.1N to a vial containing lyophilized nanoalbumin conjugate;

ii) adding a buffer of pH 3.5-5.0 to the contents of the vial of step i);

iii) adding lutetium-177 solution to the contents of the vial of step ii);

iv) transferring the vial of step iii) to the pre-heated heater for the radiolabeling for about 5-30 minutes at a temperature of about 60-90° C., preferably between 75° C. and 85° C. and cooling for about 1-20 minutes; and v) diluting the vial containing the radiolabeld product of step iv) with a saline solution to the desired volume.

According to another aspect, the conjugate compound of the present invention is radiolabeled with lutetium-177 comprising the steps of:

i) adding a buffer of pH 6.0-7.5 to a vial containing lyophilized nanoalbumin conjugate;

ii) adding lutetium-177 solution to the contents of the vial of step i);

iii) transferring the vial of step ii) to the pre-heated heater for the radiolabeling for about 5-30 minutes at a temperature of about 60-90° C., preferably between 75° C. and 85° C. and cooling for about 1-20 minutes; and v) diluting the vial with saline solution to the desired volume.

According to another aspect, the conjugate compound of the present invention is radiolabeled with technetium-99m comprising the steps of:

i) adding a buffer of pH 6.0-7.5 to a vial containing lyophilized nanoalbumin conjugate; ii) adding $SnCl_2$ in HCl 0.1N solution to the contents of the vial of step i);

iii) adding 0.9% of NaCl containing technetium-99m from a commercially available Mo-99/Tc-99m generator to the contents of the vial of step ii); and iv) letting the vial of step iii) sit at room temperature for 5-30 minutes and cooling for about 1-20 minutes.

According to another aspect, the present invention provides a pharmaceutical composition comprising the nanoconjugate compound of nanoaggregated HSA conjugated with a chelating agent and labeled with a diagnostic or therapeutic radioisotope, wherein the particle size of the nanoconjugate is in the range of 5 nm-200 nm, and one or more pharmaceutically suitable excipients selected from buffering agent, bulking agent and stabilizing agent.

According to another aspect, the present invention provides a kit comprising the nanoconjugate compound of nanoaggregated HSA conjugated with a chelating agent and labeled with a diagnostic or therapeutic radioisotope wherein the particle size of the nanoconjugate is in the range of 5 nm-200 nm, and wherein the kit comprises a clinical grade container selected from vials, syringes, ampoules, and pre-filled syringes.

BRIEF DESCRIPTION OF THE DRAWINGS

FIG. 1: Illustrates a synthetic scheme for the synthesis of nanoHSA-DOTA conjugate.

FIG. 2: Illustrates the conjugation of folate with nanoHSA-DOTA.

FIG. 3: Illustrates the chemical structure of the nanoHSA conjugates; FIG. 3(*a*) shows the structure of [$^{68}$Ga]DOTA-nanoHSA, FIGS. 3(*b*), 3(*c*) and 3(*d*) show the structures of [$^{68}$Ga]DOTA-nanoHSA-folate, [$^{99m}$Tc]DOTA-nanoHSA-folate and [$^{177}$Lu]DOTA-nanoHSA-folate respectively.

FIG. 4: Illustrates the SPECT/PET-CT images at three hours after administration of [$^{68}$Ga]DOTA-nanoHSA conjugates and [$^{99m}$Tc]Sulfur Colloid (Control) in female nude mice bearing a MDA-MB-435 tumor in the mammary pad.

FIG. 5: Illustrates the results of ex vivo imaging studies.

DETAILED DESCRIPTION OF THE INVENTION

The present invention can be more readily understood by reading the following detailed description of the invention and included embodiments.

The present invention relates to a conjugate compound comprising albumin, one or more chelating agents, and target specific ligands or drugs. The conjugate compound can be labelled with radioisotopes useful for the diagnosis and targeted therapy of cancers. The conjugate compound can be further included into a radiopharmaceutical composition, which can be a ready-to-use solution or can be lyophilized and is often reconstituted "on site" by the addition of a suitable diluent to bring the radiopharmaceutical complex into the solution at the time of administration to the patient in need of a diagnostic and/or therapeutic radiopharmaceutical.

For diagnostic imaging purposes, a conjugate compound comprises of nanoalbumin, one or more chelating agents, one or more radioisoiopes, and optionally one or more hereterobifunctional crosslinkers and target specific ligands. The conjugate compounds are capable of providing both negative and positive images of body organs, skeletal images, and the like.

The term "about" as used herein in the invention refers to a measurable value such as a parameter, an amount, a temporal duration, and the like, and is meant to encompass variations of and from the specified value, in particular variations of ±10% or less, preferably ±5% or less from the specified value, such variations are appropriate to perform in the disclosed invention. It is to be understood that the value to which the modifier "about" refers is itself also specifically, and preferably, disclosed.

As used in the specification of the present invention, the singular forms "a", "an", and "the" include plural references unless the context clearly dictates otherwise. Thus, for example, a reference to "a process" or "a composition" includes one or more process or composition, with one or more steps or ingredients or elements of the type described herein and/or which will become apparent to those persons skilled in the art upon reading this disclosure and so forth.

In another embodiment, the composition can be lyophilized powder for reconstitution, solution, suspension, or an emulsion.

As used herein, the term "imaging" refers to techniques and processes used to create images of various parts of the human body for diagnostic and treatment purposes within digital health. Some imaging techniques are referred but are not limited to X-ray radiography, Fluoroscopy, Magnetic Resonance Imaging (MRI), Computed Tomography (CT), Medical Ultrasonography or Ultrasound Endoscopy, Elastography, Hybrid Molecular Imaging for Image Guided Surgery, Tactile Imaging, Thermography Medical Photography, and nuclear medicine functional imaging techniques, like Positron Emission Tomography (PET), Dynamic Positron Emission Tomography or Single-Photon Emission Computed Tomography (SPECT). Imaging seeks to reveal internal structures of the body, as well as to diagnose and treat disease.

As used herein, the term "SPECT" refers to a Single-Photon Emission Computed Tomography, a nuclear medicine tomographic imaging technique using gamma rays and providing true 3D information. This information is typically presented as cross-sectional slices through the patient, but can be freely reformatted or manipulated as required. The technique requires the delivery of a gamma-emitting radioisotope (a radionuclide) into the patient, normally through injection into the bloodstream. A marker radioisotope is generally attached to a specific ligand to create a radioligand and/or radiopharmaceutical, whose properties bind it to certain types of tissues. This allows the radiopharmaceutical to be carried and bound to a region of interest in the body, where the ligand concentration is assessed by a SPECT camera. The radioisotopes typically used in SPECT imaging are iodine-123 (I-123), indium-111 (In-111), technetium-99m (Tc-99m), xenon-133 (Xe-133), thallium-201 (Tl-201), krypton-87m (Kr-81m), and gallium-67 (Ga-67).

As used herein, the term "Positron Emission Tomography (PET)" refers to a functional imaging technique that uses radioactive substances known as radiotracers or radiopharmaceuticals to visualize and measure changes in metabolic processes, and in other physiological activities including blood flow, regional chemical composition, and absorption. Different radiotracers can be used for various imaging purposes, depending on the target process within the body. The radioisotopes typically used in PET imaging are carbon-11 (C-11), nitrogen-13 (N-13), oxygen-15 (O-15), fluorine-18 (F-18), rubidium-82 (Rb-82), copper-64 (Cu-64), zirconium-89 (Zr-89), and gallium-68 (Ga-68).

As used herein, the term "therapy" or "therapeutic use" refers the attempt to cure, improve, mitigate, treat and/or prevent disease and/or other conditions in humans. The term "therapy" also refers to pharmacotherapy or pharmacological therapy, which refers to the treatment of disease through the application of medications (drugs). It can be used to treat or prevent development of a disease, as well as to alleviate the pain and symptoms of the particular condition. Nuclear medicine therapy can be given with the help of radioisotopes like alpha emitters actinium-225 (Ac-225), astatine-211 (At-211), etc. and beta emitters such as lutetium-177 (Lu-177), lead-212 (Pb-212), etc.

As used herein, the term "Hybrid Molecular Imaging" refers to the fusion of two or more imaging technologies into a single, new form of imaging. This form is synergistic, which is more powerful than the sum of its parts. Hybrid imaging denotes image acquisitions on systems that physically combine complementary imaging modalities for an improved diagnostic accuracy and confidence as well as for increased patient comfort. The hybrid imaging combines the strengths of two imaging modalities in one imaging session to more accurately diagnose and locate cancers while increasing patient comfort. These are generated by superimposing two images at two different spatial scales: the low-spatial scale is obtained by filtering one image with a low-pass filter; the high spatial scale is obtained by filtering a second image with a high-pass filter. Examples of hybrid imaging modalities include PET-CT, SPECT-CT and PET-MRI.

As used herein, the term "diagnosis" refers to the process of identifying a disease, condition, or injury from its signs and symptoms. A health history, physical exam, and tests such as blood tests, imaging, scanning, and biopsies can be used to help make a diagnosis.

As used herein, the term "assessment" refers to a qualitative and/or quantitative assessment of the blood perfusion, solid tumors or any other disease or abnormality in a body part or region of interest (ROI).

As used herein, the term "chemotherapeutic agents" are also referred to as antineoplastic agents, which are used to directly or indirectly inhibit the uncontrolled growth and proliferation of cancer cells.

As used herein, the term "dose" refers to the dose of a radionuclide required to perform imaging in a subject. The dose of a radionuclide to be administered into the subject ranges from 0.01 MBq to 10,000 MBq.

As used herein, the term "image counts" refers to the number of radioisotope disintegrations acquired per unit time by the PET scanner.

As used herein, the term "radionuclide or radioisotope" refers to an unstable form of a chemical element that releases radiation as it breaks down and becomes more stable. Radionuclides can occur in nature or can be generated in a laboratory. In medicine, they are used in imaging tests and/or in the treatment of diseases.

As used herein, the term "generator" or "radioisotope generator" refers to a hollow column inside a radio-shielded container. The column is filled with an ion exchange resin and radioisotope loaded onto the resin. Radionuclide generator according to the present invention is selected from $^{99}$Mo/$^{99m}$Tc, $^{90}$Sr/$^{90}$Y, $^{188}$W/$^{188}$Re, $^{68}$Ge/$^{68}$Ga, $^{42}$Ar/$^{42}$K, $^{44}$Ti/$^{44}$Sc, $^{52}$Fe/$^{52m}$Mn, $^{72}$Se/$^{72}$As, $^{103}$Pd/$^{103m}$Rh, $^{109}$Cd/$^{109m}$Ag, $^{113}$Sn/$^{113m}$In, $^{118}$Te/$^{118}$Sb, $^{137}$Cs/$^{137m}$Ba, $^{140}$Ba/$^{140}$La, $^{134}$Ce/$^{134}$La, $^{144}$Ce/$^{144}$Pr, $^{140}$Nd/$^{140}$Pr, $^{166}$Dy/$^{166}$Ho, $^{167}$Tm/$^{167m}$Er, $^{172}$Hf/$^{172}$Lu, $^{178}$W/$^{178}$Ta, $^{191}$Os/$^{191m}$Ir, $^{194}$Os/$^{194}$Ir, $^{225}$Ac/$^{213}$Bi, and $^{64}$Cu/$^{64}$Zn.

As used herein, the term "eluant" refers to the liquid or the fluid used for selectively leaching out the daughter radioisotopes from the generator column.

As used herein, the term "eluate" refers to the radioactive eluant after acquisition of daughter radioisotope from the generator column.

As used herein, the term "nanoparticles" or "nanoparticulated" refers to an albumin polymer with nano size. The present invention refers to a complex or conjugate of albumin bound to one or more chelating agents, one or more target specific ligands and/or one or more pharmaceutically acceptable therapeutic agents, and which is a solvent-free formulation available in nanoparticles or nanoparticulated form. The said nanoparticles are prepared by high-pressure homogenization or heat denaturation of albumin. The nanoparticulated conjugates are then prepared by chemically coupling the nanoparticles' albumin with one or more chelating agents, and optionally one or more target specific ligands and/or one or more pharmaceutically acceptable therapeutic agents. The albumin binds to one or more chelating agents and optionally to one or more target specific ligands and/or one or more pharmaceutically acceptable therapeutic agents in a nanoparticulated form having particle size of about 5 nm to about 200 nm, preferably of about 10 nm to about 180 nm, more preferably of about 15 nm to about 150 nm.

As used herein, the term "conjugate" means a compound formed by the joining of two or more chemical compounds. The conjugate of the present invention is prepared by joining one or more chelating agents, one or more target specific ligands, one or more radioisotopes and optionally one or more therapeutic agents to a nanoparticulated albumin. The conjugate of the present invention also is a nanoparticle and therefore can be referred to as nanoconjugate. The terms conjugate and nanoconjugate have been used interchangeably throughout the text of the current specification.

As used herein, the terms "polydispersity index (PDI)" refers to a measure of the heterogeneity of a sample based on size. Polydispersity can occur due to size distribution in a sample or agglomeration or aggregation of the sample during isolation or analysis. The numerical value of PDI may vary from 0 to 1, where the colloidal particles with PDIs less than 0.1 implies monodisperse particles and the values more than 0.1 may imply polydisperse particle size distributions. When the values of PDIs are 0.2 and below, the particles are considered acceptable in practice for polymer-based nanoparticle materials.

As used herein, the term "Lymphoscintigraphy" or "lymphatic imaging" refers to the identification of sentinel lymph nodes and the flow of lymph through the body. The radiolabeled conjugate compound and/or composition is being injected and immediately after the injection, the gamma camera or SPECT/PET scanner is used to take a series of images of the area of the body being studied. When imaging begins, the camera or scanner takes a series of images. After administration of the conjugate composition, which is nanoparticulated, the EPR agent and other target specific ligands are allowed to release at the target site and the cellular internalization by the solid tumors takes place, which helps in diagnosis and therapy. Nanoparticles exhibit enhanced permeability and retention (EPR) effects in solid tumors and play a particularly important role for tumor imaging. The conjugate compounds as described herein as the present invention provide a nanoparticulated form for lymphoscintigraphy or lymphatic imaging and theragnostics and having a particle size of about 5 nm to about 200 nm, preferably of about 10 nm to about 180 nm, more preferably of about 15 nm to about 150 nm.

As used herein, the term "chelating agents" or "chelate-functionalized targeting agent" refers to agents that are capable of chelating the radioactive metal or radioisotope.

As used herein, the term "co-chelating agents" refers to agents that are capable of inactivating metals other than radioactive metal without interfering with the chelation between the radioactive metal and the said chelate-functionalized targeting agent, under the conditions of the labelling reaction.

As used herein the term "radiochemical purity" refers to the proportion of the total radioactivity in the sample which is present as the desired radiolabelled species. Radiochemical purity is important since it is the radiochemical form that determines the biodistribution of the radiopharmaceutical. The present invention includes the pharmaceutical composition, wherein the composition has a radiochemical purity of at least 90 percent, preferably 95 percent, most preferably 100 percent, for 3 hours at room temperature.

As used herein, the term "conjugate" or "conjugates" or "conjugate compound" or "complex" or "complex compound" refers to a substance formed by the combination of two or more compounds which exist independently and apparently are attached together and have no valence force for combination according to chemical concepts. Further, in the present invention, the term "complex" can be described as a complex comprising one or more conjugate compounds. The said complex further is used to prepare a radiopharmaceutical composition, which can be in the form of a lyophilized, ready-to-use solution, suspension, or combinations thereof. The conjugate compound is used for imaging/diagnosis and/or therapeutic purposes thereof.

As used herein, the term "albumin" refers to a water-soluble globular protein with a molecular weight of 66.5 kDa. It is found in egg white, blood, lymph, tissues, and other fluids, but the most common of which are the serum albumins. It is the major plasma protein responsible for plasma colloidal osmotic pressure. Its role is to transport protein carrying large organic anions (e.g. fatty acids, bilirubin, and many drugs), and certain hormones (e.g. cortisol and thyroxine). All the proteins of the albumin family are water-soluble, moderately soluble in concentrated salt solutions, and experience heat denaturation. Albumins are commonly found in blood plasma and differ from other blood proteins in that they are not glycosylated. The serum albumin is synthesized in the liver; it is soluble in water and monomeric. The conjugate compound is obtained from the albumin nanoparticle comprising one ore more albumin molecules (monomers). Substances containing albumins are called albuminoids. The albumin can preferably be bound with one or more chelating agents, one or more detectable agents, one or more hereterobifunctional crosslinkers, one or more target specific ligands and/or combinations thereof, wherein the conjugate has a particle size of about 1 nm to about 250 nm, more preferably of about 2 nm to about 180 nm, and most preferably of about 5 nm to about 100 nm. The particle size may vary in case of lymphatic imaging, wherein the particle size of the said conjugate compound is from about 2 nm to about 100 nm and more preferably 5 nm to about 50 nm.

As used herein, the term "enhanced permeability and retention (EPR)" refers a universal pathophysiological phenomenon and mechanism in which macromolecular compounds such as albumin, specifically, human serum albumin (HSA), bovine serum albumin (BSA), recombinant albumin, recombinant human albumin, ovalbumin, alpha lactalbumin and/or combinations thereof and other natural and synthetic polymers beyond certain sizes (above 40 kDa) such as polyethylene glycol (PEG), dextran, polyglutamate (PG), polylactide (PLA), poly(D,L-lactide-co-glycolide)(PLGA), N-(2-hydroxypropyl) methylacrylamide (HMPA), can progressively accumulate in the tumor vascularized area and thus achieve targeting delivery and retention of anticancer compounds into solid tumor tissue. The EPR agent carries one or more chelating agents and one or more detectable agents from the EPR agent to increase the cellular internalization or uptake by the solid tumors. The EPR agent carries one or more target specific ligands, one or more chelating agents and one or more detectable agents for imaging and/or treatment of the diseases. Particularly, the present invention provides a complex comprising one or more conjugate compounds comprising nanoalbumin bound with one or more chelating agents and one or more detectable agents, which can be radionuclides/radioisotopes, fluorescent agents, dyes and/or combinations thereof; and one or more target specific ligands, one or more hereterobifunctional crosslinkers (CL), and optionally one or more pharmaceutically acceptable therapeutic agents. The complex provides improved sensitivity by the characterization of nanosize of albumin and multiple radioisotope binding chelate units, increased circulation of nanoalbumin carrier, increased internalization or uptake of nanoalbumin carrier by the solid tumors, and safe and efficacious tracers for the detection of primary and metastatic tumor cells.

As used herein, the term "heterobifunctional crosslinkers" refers that a heterobifunctional crosslinker containing two different reactive functional groups that are separated at various lengths. The reactive ends are chosen for their particular chemoselective properties, often targeting the primary amines and sulfhydryl groups of proteins.

As used herein, the term "cellular internalization" refers to a process by which biological and foreign matter is taken up by the cells, specifically biological and foreign matter, which are targeted for therapy and taken up by the solid tumor cells. The mechanism of the said cellular internalization is based on endocytosis, i.e., dependent on energy or enzyme. The nanoparticles tend to undergo internalization predominantly. The interaction of nanoparticles with the cell membrane plays a crucial role in endocytosis and intracellular trafficking. Nanoparticulate albumin is one of the effective enhanced permeability and retention (EPR) agents which increase the cellular internalization by the solid tumors of cancer cells.

An embodiment of the present invention includes a conjugate compound comprising of the following formula:

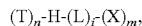

$$(T)_n\text{-}H\text{-}(L)_i\text{-}(X)_m,$$

wherein:

i) T denotes a target specific ligand;

ii) H is an EPR agent;

iii) L denotes a chelating agent; and iv) X denotes a radioisotope or a detectable agent;

wherein n and i both are integers of value 0-5 and m is an integer of value 1-5; and wherein the EPR agent is albumin; and wherein the conjugate compound further optionally comprises one or more heterobifunctional crosslinker and/or one or more pharmaceutically acceptable therapeutic agents; and wherein the said conjugate compound has a particle size of from about 5 nm to about 200 nm.

An embodiment of the present invention includes the conjugate compound wherein the radioisotope is selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-214, lead-212, rhenium-188, rhenium-186, and/or combinations thereof.

An embodiment of the present invention includes the conjugate compound wherein the one or more chelating agents are selected from the group consisting of 2,2',2",2'"-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis (carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof.

An embodiment of the present invention includes the conjugate compound wherein the one or more target specific ligands are selected from the group consisting of folate receptor targeted agents, HER 2 antibody, PSMA binding ligands, FAPα inhibitors, GRPR inhibitors, PD-1 inhibitors and PD-L1 inhibitors, PARP inhibitors (PARPi), somatostatin receptor antagonists and/or combinations thereof.

An embodiment of the present invention includes the conjugate compound wherein the one or more heterobifunctional crosslinkers are selected from the group consisting of succinimidyl 4-(N-maleimidomethyl)cyclohexane-1-carboxylate (SMCC and/or MCC), m-maleimidobenzoyl-N-hydroxysuccinimide ester (MBS), N-(beta-maleimidopropyloxy)succinimide ester (BMPS), N-[e-maleimidocaproyloxy]succinimide ester (EMCS), N-[gamma-maleimidobutyryloxy]succinimide (GMBS), N-succinimidyl 4-[4-maleimidophenyl]butyrate (SMPB), succinimidyl-6-(β-maleimidopropionamido)hexanoate (SMPH), and maleimide-polyethylene glycol-N-hydroxysuccinimide ester (MAL-PEG-NHS) and/or combinations thereof.

An embodiment of the present invention includes the conjugate compound wherein the one or more pharmaceutically acceptable therapeutic agents are selected from the group consisting of Cabazitaxel, Docetaxel, Nab-paclitaxel, Paclitaxel; Vinblastine, Prednisone, Methylprednisolone, Dexamethasone, Daunorubicin, Epirubicin, Idarubicin, Valrubicin, Gemcitabine, Methotrexate, Pralatrexate, Azacitidine, 5-fluorouracil (5-FU), 6-mercaptopurine (6-MP), Capecitabine, Cladribine, Clofarabine, Cytarabine, Decitabine, Floxuridine, Fludarabine, Carmustine, Lomustine, Streptozocin, Cisplatin, Cyclophosphamide, Dacarbazine, Ifosfamide, Mechlorethamine, Melphalan, Oxaliplatin, Temozolomide, Thiotepa, Altretamine, Bendamustine, Busulfan, Carboplatin and combinations thereof.

An embodiment of the present invention includes a method of diagnosis and/or treatment of ovarian cancer, breast cancer, prostate cancer, thyroid cancer, neuroendocrine tumors (NETs), pancreatic cancer, non-small cell lung cancer (NSCLC), and/or combinations thereof, using the conjugate compound.

Another embodiment of the present invention provides a conjugate compound comprising of the following formula:

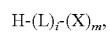

$$H\text{-}(L)_i\text{-}(X)_m,$$

wherein:

i) H is albumin;

ii) L is a chelating agent selected from the group consisting of 2,2',2",2'"—(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis(carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof; and iii) X is a radioisotope selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-212, rhenium-188, rhenium-186, and/or combinations thereof; and wherein i is an integer of value 0-5 and m is an integer of 1-5; and wherein the said conjugate compound has a particle size of from about 5 nm to about 200 nm; and wherein the conjugate compound can further optionally comprise one or more target specific ligands.

In an embodiment of the present invention, the albumin can be selected from the group consisting of human serum albumin (HSA), bovine serum albumin (BSA), recombinant albumin, recombinant human albumin, ovalbumin, alpha lactalbumin and/or combinations thereof.

In an embodiment, the present invention provides a method of imaging sentinel lymph nodes using the conjugate compound of the invention.

In an embodiment, the present invention provides a method of diagnosis and/or treatment of epithelial ovarian cancer using the conjugate compound.

In another embodiment the present invention provides a conjugate compound comprising of the following formula:

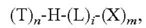

$(T)_n$-H-$(L)_i$-$(X)_m$, wherein:

i) T denotes a folate targeted ligand;

ii) H is albumin;

iii) L is a chelating agent selected from the group consisting of 2,2',2",2'"-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), Diethylenetriamine pentaacetate (DTPA), 1,4-bis(carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, hydroxybenzyl ethylenediamine (HBED), HBECC, 1,4,7-triazacyclononane, 1-glutaric acid-4,7-acetic acid (NODAGA), desferrioxamine (DFO), N,N'-bis(2,2-dimethyl-2-mercaptoethyl)ethylenediamine-N,N'-diacetic acid (6SS), 1-(4-carboxymethoxybenzyl)-N—N'-bis[(2-mercapto-2,2-dimethyl)ethyl]-1,2-ethylenediamine-N,N'-diacetic acid (B6SS), PLED (N,N'-dipyridoxylethylenediamine-N,N'-diacetic acid), TAME, YM103, 1,2-bis[[(6-carboxypyridin-2-yl)methyl]amino]ethane (H2dedpa), and/or combinations thereof; and iv) X is a radioisotope selected from the group consisting of copper-64, copper-67, fluorine-18, indium-111, iodine-123, iodine-125, iodine-131, gallium-68, gallium-67, gallium-66, lutetium-177, yttrium-86, yttrium-90, technetium-99m, scandium-47, scandium-44, scandium-43, zirconium-89, bismuth-213, bismuth-212, actinium-225, astatine-211, gold-198, gold-199, lead-212, rhenium-188, rhenium-186, and/or combinations thereof;

wherein n and m both are integers of value 1-5 and i is an integer of value 0-5; and wherein the said conjugate compound has a particle size of from about 5 nm to about 200 nm.

In an embodiment of the present invention, the folate targeted ligand can be selected from the group consisting of folic acid (and derivatives) and folate salts (and derivatives) including tetrahydrofolate, 5-formyltetrahydrofolate, 5,10-methylenetetrahydrofolate, 5-methyltetrahydrofolate, FBA-γ-folate, fluoro-benzene-carbohydrazide-folate, fluoro-pyridine-carbohydrazide-folate, methotrexate, fluoro-pyridine-carbohydrazide-methotrexate, fluoro-deoxy-glucose-folate, and 3'-aza-2'-fluorofolic acid.

In an embodiment the present invention provides a method of diagnosis and/or treatment of ovarian cancer, breast cancer, prostate cancer, thyroid cancer, neuroendocrine tumors (NETs), pancreatic cancer, non-small cell lung cancer (NSCLC), and/or combinations thereof, using the conjugate compound.

In an embodiment the present invention provides a method of regional lymph nodes treatment post tumor surgery using the conjugate compound.

In an embodiment the present invention provides a method of treatment of epithelial ovarian cancer using the conjugate compound.

Folate receptor (FR) targeted agents are very useful in the treatment of various types of cancers and act as target specific ligands in diagnostic radiopharmaceuticals. In case of solid tumors and ovarian cancer, which are typically not diagnosed until they are at a late stage, folate receptors help in detecting the cancer at an early stage. An embodiment of the present invention includes the conjugate compound, wherein the folate receptor targeted agents are selected from the group consisting of folate conjugates and/or folate-drug conjugate such as folic acid and/or its folate derivatives. The folate receptors are expressed in many tumor types, among those ovarian, breast, and lung cancer. Due to the high folate receptors affinity of folic acid, it has been used for targeting of folate receptor-positive tumors, allowing specific delivery of attached ligands and pharmaceutical agents to the malignant tissue. Folate receptor specific ligands are mostly used in treatment of ovarian, breast, renal, non-small cell lung cancer (NSCLC) and hepatic colorectal cancers. Folic acid-based radiotracers includes [In-111]DTPA-folate, [Tc-99m]EC20, [F-18]polyethylene glycol folate, and [F-18]AzaFol, which have been used in clinics for SPECT or PET imaging of rheumatoid arthritis, ovarian or lung cancers.

An embodiment of the present invention includes the conjugate compound, wherein one or more target specific ligands are selected from the group consisting of PSMA binding ligands such as PSMA-11, PSMA-617, PSMA I&T, PSMA I&S, DCFPyL, PSMA-1007, PSMA-2003, PSMA-2002, PSMA-ADC, bis-PSMA, Radiohybrid PSMA (rhPSMA), PSMA-R2, PSMA-TTC, bis PSMA binding ligand, and/or combinations thereof.

Fibroblast activation protein (FAP) is a cell membrane-bound serine peptidase, overexpressed in cancer-associated fibroblasts and activated fibroblasts at wound healing/inflammatory sites. Fibroblast activation protein α (FAPα) is a dual-specificity dipeptidyl-peptidase and collagenase, which is highly suitable for imaging and therapy. Examples of FAPI are selected from the group consisting of FAPI-02, FAPI-03, FAPI-04, FAPI-05, FAPI-06, FAPI-07, FAPI-08, FAPI-09, FAPI-10, FAPI-11, FAPI-12, FAPI-13, FAPI-14, FAPI-15, FAPI-20, FAPI-21, FAPI-22, FAPI-31, FAPI-34, FAPI-35, FAPI-36, FAPI-37, FAPI-46, FAPI-74, FAPI-76, FAP-2286, or combinations thereof.

HER2 antibodies include but are not limited to trastuzumab, pertuzumab, MM-111, ertumaxomab, blinatumomab, or combinations thereof. Programmed Death-1 (PD-1) inhibitors and Programmed Death-Ligand 1 (PD-L1) inhibitors include Nivolumab, Pembrolizumab, Atezolizumab, Avelumab, Durvalumab, Cemiplimab, Dostarlimab, Vopratelimab, Spartalizumab, Camrelizumab, Sintilimab, Tislelizumab, Toripalimab, MGA012, AMP-224, AMP-514, Acrixolimab, Cosibelimab, and/or combinations thereof. Gastrin-Releasing Peptide Receptor (GRPR) antagonists include but are not limited to NeoBOMB1, RM2, Sarabesin 3 (SB3), JMV4168 and/or combinations thereof. Poly Adenosine diphosphate-Ribose Polymerase (PARP) inhibitors (PARPi) include but are not limited to Olaparib, Niraparib Tosylate, Rucaparib Camsylate, Talazoparib Tosylate, Veliparib, Stenoparib, AZD5305 and/or combinations thereof. Somatostatin receptor antagonists include but are not limited to pasireotide, lanreotide, octreotide, edotreotide, and/or combinations thereof.

An embodiment of the present invention includes the conjugate compound, wherein the conjugate compound is used for diagnosis of solid tumors and/or cancers with nuclear imaging and/or hybrid molecular imaging for image guided surgery and wherein the conjugate compound is used for the treatment of cancers alone or in combination with robot-assisted surgery.

An embodiment of the present invention includes the conjugate compound, wherein the conjugate compound is used for the diagnosis, treatment, monitoring treatment and adjusting treatment regimens of ovarian cancer, breast cancer, prostate cancer, thyroid cancer, neuroendocrine tumors (NETs), pancreatic cancer, non-small cell lung cancer (NSCLC), and/or combinations thereof, on the basis of real time imaging data.

Particle size is the one of the most important informations in practical applications. Any conjugate compound or composition are constituted by particles of various sizes and, therefore, it is necessary to obtain not only the mean particle size but also the size distribution and zeta potential for the characterization. In the case of a nanoparticulated conjugate or composition, determination of particle size and its distribution is even more important to develop a stable form for administration. Particle size analyzers with prominent characteristics such as rapid response, high repeatability, and covering wide range of particle size are developed as in the case of laser scattering and diffraction method. Examples of such analyzers that can measure the nanoparticles include but are not limited to Scanning electron microscope (SEM), transmission electron microscope (TEM), Gravitational liquid sedimentation methods, Centrifugal liquid sedimentation, Electrical-sensing zone, Laser diffraction, Photon correlation spectroscopy, Image analysis methods, Single-particle light interaction, Dynamic light scattering (DLS), Disc centrifugation (DC), Nanoparticle tracking analysis, Tunable Resistive Pulse Sensing, Atomic force microscopy, Electron microscopy, Ultrasonic attenuation spectroscopy, and Focused beam techniques. Some commercially available particle size distribution analyzers include but are not limited to Z-average, Malvern Zetasizer, Brunauer EmmetteTeller (BET) specific surface measurement, and the like.

Malvern Zetasizer measures the particle size based on the principle of Dynamic Light Scattering (also known as PCS-Photon Correlation Spectroscopy). It measures Brownian motion and relates this to the size of the particles. It does this by illuminating the particles with a laser and analysing the intensity fluctuations in the scattered light. In Dynamic light scattering (DLS), subtle fluctuations in the sample scattering intensity are correlated across microsecond time scales. The first order result from a DLS experiment is the intensity distribution of particle sizes. The intensity distribution is weighted according to the scattering intensity of each particle fraction or family. The volume or number distributions can be calculated from the intensity distribution using Mie theory.

Albumin nanoparticles can be prepared by different techniques such as thermal denaturation, desolvation, spray drying, coacervation, and emulsification. In a preferred embodiment albumin nanoparticles are prepared by heat denaturation of albumin under controlled pH and stirring to form a nanoparticulate colloidal suspension followed by lyophilization to provide a solid. The nanoparticulated conjugates are then prepared by chemically coupling the albumin nanoparticles with one or more chelating agents, and optionally one or more target specific ligands and/or one or more pharmaceutically acceptable therapeutic agents and optionally using one or more heterobifunctional crosslinker agents. The nanoparticulate conjugates are subsequently purified by size-exclusion chromatography and lyophilized to provide a solid. The resultant albumin nanoparticulated conjugates have particle size of about 5 nm to about 200 nm, preferably of about 10 nm to about 180 nm, more preferably of about 15 nm to about 150 nm. On the other hand, the zeta potential indicates the degree of repulsion between adjacent, similarly charged, particles in a dispersion. For molecules and particles that are small enough, a high zeta potential will confer stability, i.e., the solution or dispersion will resist aggregation. Nanoparticles with a zeta potential between −10 mV and +10 mV are considered approximately neutral, while nanoparticles with zeta potentials of greater than +30 mV or less than-30 mV are considered strongly cationic and strongly anionic, respectively.

In case of lymphatic imaging or scintigraphy, identifying sentinel lymph nodes and the flow of lymph through the body is very important for early detection of the diseases/lesions. The radiolabeled conjugate compound is injected and a gamma camera or SPECT/PET scanner is used to take a series of images of the area of the body being studied. After administration of the conjugate compound, which is in nanoparticulated form, the EPR agent and other target specific ligands are allowed to release at the target site and the cellular internalization by the solid tumors takes place, which helps in diagnosis and therapy. Hence, particle size plays an important role in lymphoscintigraphy or lymphatic imaging by permitting cellular internalization or uptake of the nanoparticulated radiotracer into lymph nodes, which helps to identify the sentinel lymph node or the first node to receive the lymph drainage from a tumor. Lymphoscintigraphy or lymphatic imaging is also helpful in planning for a biopsy or surgery for cancer stage assessment and in identifying points of blockage in the lymphatic system, such as lymph flow in an arm or leg, or lymphedema. The nanoparticulated conjugate of the present invention is expected to allow performing such assessments.

An embodiment of the present invention includes the conjugate compound, wherein the conjugate compound is used in the treatment of cancers and the conjugate compound has a particle size of about 5 nm to about 200 nm, preferably of about 10 nm to about 180 nm, more preferably of about 15 nm to about 150 nm, most preferably of about 20 nm to about 100 nm.

An embodiment of the present invention includes the conjugate compound, wherein the conjugate compound is used in lymphoscintigraphy or lymphatic imaging and the conjugate compound has a particle size of about 5 nm to about 200 nm, preferably of about 10 nm to about 180 nm, more preferably of about 15 nm to about 150 nm.

Nanoparticles exhibit enhanced permeability and retention effects in solid tumors and play a particularly important role in tumor diagnostics and/or therapy. The conjugate compounds as described herein provide a nanoparticulated form for lymphoscintigraphy or lymphatic imaging and theragnostics, and have a particle size of about 5 nm to about 200 nm, preferably of about 10 nm to about 180 nm, more preferably of about 15 nm to about 150 nm. The minimum particle size distribution ($d_{10}$) of the nanoparticles ranges from about 15 nm to about 40 nm, the mean particle size distribution ($d_{50}$) of the nanoparticles ranges from about 25 nm to about 90 nm, and the maximum particle size distribution ($d_{90}$) of the nanoparticles ranges from about 40 nm to about 200 nm.

An embodiment of the present invention includes the conjugate compound, wherein the conjugate compound is administered intravenously, intraarterially, intrapulmonarily, intravesicularly, intramuscularly, intra-tracheally, subcutaneously, intraocularly, intrathecally, intrauterine, transdermally or by interstitial or intratumoral injection.

An embodiment of the present invention includes the conjugate compound, wherein the albumin and one or more chelating agents are present in a ratio of 1:100, preferably 1:80, more preferably 1:60, or at a range of such ratios, e.g., a ratio of 1:100 to 1:60.

The polydispersity index (PDI) is a measure of the heterogeneity of a sample based on size. It can occur due to size distribution in a sample or agglomeration or aggregation of the sample during isolation or analysis. The numerical value of PDI may vary from 0 to 1, where the colloidal particles with PDIs less than 0.1 implies monodisperse particles and the values more than 0.1 may imply polydisperse particle size distributions. When the values of PDIs are 0.2 and below, the particles are considered acceptable in practice for polymer-based nanoparticle materials. An embodiment of the present invention includes the conjugate compound with an expected polydispersity index less than 0.5.

The zeta potential is an important characterization parameter that indicates the stability of nanoparticulate dispersions. The magnitude of the zeta potential is an indicator of the degree of electrostatic repulsion between adjacent, similarly charged particles in a colloidal dispersion. A high zeta potential indicates that the colloidal dispersion will resist aggregation and will be stable whereas when the value of the zeta potential is small, attractive forces may predominate over the repulsive forces and the nanoparticulate dispersion will be unstable due to aggregation. So, colloids with high negative or positive zeta potential are electrically stabilized while colloids with low zeta potentials tend to coagulate or flocculate.

In an embodiment, the conjugate compounds of the present invention have an initial radiochemical purity of not less than 80 percent for at least 3 hours at room temperature.

High purity and stability are pivotal requirements for chemical compounds used as active ingredients in pharmaceuticals and in final dosage form.

Another objective of the present invention is primarily to provide stabilized forms of conjugates, which are stable and allow an easier handling of the substance during synthesis, quality control and manufacture of the kit. Another object of the invention is to provide a kit containing a stabilized form of conjugates resulting in higher stability, e.g. a prolonged kit shelf life.

The prepared conjugates are substantially pure and have pharmaceutical impurities like Key Starting Material (KSM), degradation impurity, other undesirable impurities less than 5% and more preferably less than 0.5% and more preferably less than 0.1%.

Another embodiment of the present invention includes use of the conjugate compounds for image processing to diagnose/assess tissue lesions quantitatively, wherein the image reconstruction algorithms have been developed to improve the quality of images and use an artificial intelligence (AI) algorithm to enhance the image reconstruction quality, which intended to do the image processing faster and reduce the doses of nuclear medicine or use of radioisotopes up to 10 times during the diagnosis and/or therapy.

An embodiment of the present invention includes the conjugate compounds, wherein the radioactivity of the conjugate compounds ranges from 0.0001 MBq to 10,000 MBq.

An embodiment of the present invention includes the conjugate compounds, wherein the conjugate compounds can further be used to prepare a composition.

An embodiment of the present invention includes the composition comprising the conjugate compound, wherein the composition further comprises one or more stabilizers, one or more buffers and optionally one or more pharmaceutically acceptable excipients.

An embodiment of the present invention includes the composition comprising the conjugate compound, wherein the composition is an injectable composition, packaged in a single vial or multiple vial kit.

An embodiment of the present invention includes the composition comprising the conjugate compound, wherein the conjugate compound is formulated as a lyophilized formulation, ready-to-use formulation, solution, suspension, or an emulsion and/or combinations thereof.

An embodiment of the present invention includes the composition comprising the conjugate compound, wherein the composition has a pH of from about 2 to about 4.2 or from about 6 to about 9, preferably from about 3 to about 4 or from about 6.5 to about 8, more preferably from about 3.5 to about 3.8 or from about 7 to about 7.5.

An embodiment of the present invention includes the composition comprising the conjugate compound in the form of a lyophilized composition in a vial, wherein the lyophilized vial comprises less than 5 percent of oxygen in the headspace, preferably less than 3 percent, more preferably less than 1 percent, and even more preferably less than 0.5 percent.

In an embodiment, the present invention provides a reconstituted pharmaceutical nanoconjugate composition comprising nanoaggregated HSA conjugated with a chelating agent and labeled with a diagnostic or therapeutic radioisotope wherein the particle size of the nanoconjugate is in the range of 5 nm-200 nm, reconstituted by addition of a suitable buffer or a solution of a suitable radionuclide salt or a combination thereof.

An embodiment of the present invention includes the synthesis of a nanoparticulated conjugate compound comprising one or more monomers of albumin conjugated to one or more chelators and one or more heterobifunctional cross-linkers bound to a target specific ligand.

In an embodiment of the present invention a synthesis process for making the conjugate compound is provided which comprises the following steps: a) dissolving lyophilized albumin nanocolloid (nanoalbumin) in a suitable buffer of pH of about 8.5; b) adding a chelating agent pre-dissolved in the same buffer of step a); c) stirring the mixture for 8-12 hours at room temperature (about 20-25° C.); d) purifying the conjugate product produced at step c) by size exclusion chromatography; and e) lyophilizing the nanoalbumin conjugated with the chelating agent produced at step d). The scheme of the synthesis is shown in FIG. 1.

An embodiment of the present invention includes a conjugate compound synthesized according to FIG. 1, wherein the compound is radiolabeled with gallium-68 in a process comprising the steps of: a) eluting a 5 ml 0.1N HCl elution solution through a commercially available Ge-68/Ga-68 generator; b) collecting the 5 ml [$^{68}$Ga]Ga$Cl_3$ eluate of step a); c) adding the radioactive eluate of step b) to a vial containing a nanoalbumin conjugate previously prepared; d) adding a buffer acetate to the vial of step c); e) transferring the vial of step d) to a pre-heated heater for radiolabeling for about 5-30 minutes at a temperature of about 60-90° C., preferably between 70° C. and 80° C. and cooling for about 1-20 minutes; and f) diluting the vial of step e) containing the radiolabelled compound with a saline solution to the desired volume.

An embodiment of the present invention includes a conjugate compound synthesized according to FIG. 1, wherein the compound is radiolabeled with lutetium-177 by following the steps of:

i) adding HCl 0.1N to a vial containing a lyophilized nanoalbumin conjugate;
ii) adding a buffer of pH 3.5-5.0 to the vial of step i);
iii) adding lutetium-177 solution to the vial of step ii);
iv) transferring the contents of the vial of step iii) to the pre-heated heater for radiolabeling for about 5-30 minutes at a temperature of about 60-90° C., preferably between 75° C. and 85° C. and cooling for about 1-20 minutes;
v) diluting the vial of step iv) with a saline solution to the desired volume.

An embodiment of the present invention includes a conjugate compound synthesized according to FIG. 1, wherein the compound is radiolabeled with lutetium-177 by following the steps of:

i) adding a buffer of pH 6.0-7.5 to a vial containing a lyophilized nanoalbumin conjugate;
ii) adding lutetium-177 solution to the vial of step i);
iii) transferring the vial of step ii) to the pre-heated heater for the radiolabeling for about 5-30 minutes at a temperature of about 60-90° C., preferably between 75° C. and 85° C. and then cooling for about 1-20 minutes; and
v) diluting the contents of the vial of step iii) with a saline solution to the desired volume.

An embodiment of the present invention includes a conjugate compound synthesized according to FIG. 1, wherein the compound is radiolabeled with technetium-99m by following the steps of:

i) adding a buffer of pH 6.0-7.5 to a vial containing a lyophilized nanoalbumin conjugate;
ii) adding $SnCl_2$ in HCl 0.1N solution to the vial of step i);
iii) adding 0.9% of NaCl containing technetium-99m obtained from a commercially available Mo-99/Tc-99m generator to the vial of step ii); and
iv) letting the vial of step iii) sit at room temperature for 5-30 minutes and then cooling for about 1-20 minutes.

Alternatively, the radiolabeling can be performed by using a microwave. Each embodiment disclosed herein is contemplated as being applicable to each of the other disclosed embodiments. Thus, all combinations of the various elements described herein are within the scope of the invention.

This invention will be better understood by reference to the experimental data, which follow, but those skilled in the art will readily appreciate that the specific experiments detailed are only illustrative of the invention as described more fully in the claims, which follow thereafter.

Example 1. Characterization of [$^{68}$Ga]DOTA-nanoHSA Conjugates

The conjugates were prepared according to the scheme depicted in FIG. 1, where nanoHSA refers to nanoparticle preparations having a mean particle size of 22±5 nm (n=3) or 54±13 nm (n=3). The structure of the nanoHSA conjugates are depicted in FIG. 3. After radiolabeling the conjugate compounds with Gallium-68, the [$^{68}$Ga]DOTA-nanoHSA products, [$^{68}$Ga]JUB01 and [$^{68}$Ga]JUB02, respectively, were subjected to various characterization tests such as particle size distribution, polydispersity index (PI) and zeta potential using a Malvern Zetasizer. JUB-01 refers to the 68Ga-Nano-HSA conjugate of mean particle size 32 nm and JUB-02 refers to the 68Ga-Nano-HSA conjugate of mean particle size 72 nm. Particle size analysis is performed using Dynamic Light Scatering (DLS) equipment. The DLS procedure was as follows: Place 100 μl into a DLS cuvette and perform the measurement of the particle size distribution by DLS equipment.

The Radiochemical purity (RCP) of the labelled conjugates was determined by Radio-Instant Thin Layer Chromatography (ITLC) method. The results are shown in Table 1. The ITLC procedure was as follows: Take 1 μl drop with a micropipette and spot on a strip (iTLC-SG, 11.5 cm×1 cm) and develop in 1 mL of mobile phase (sodium citrate 0.1 M) in the chromatography chamber. After development, the strip is scanned using a Bioscan. RCP is calculated based on the % Area of the main peak in the chromatogram. The RCP should be more than 90%.

The feasibility of labeling the DOTA-nanoconjugates with Gallium-68 was demonstrated with initial RCP values higher than 90%. The RCP remained constant for at least three hours post labeling at room temperature, indicating high in-use stability of the products. The average particle size of the labeled conjugates with [$^{68}$Ga]JUB01 and [$^{68}$Ga]JUB02 were 32±6 nm (n=14) and 71±12 nm (n=10), respectively, with PI less than 0.5. High positive zeta potential indicated stability of the nanoconjugates.

TABLE 1

| Characterization of [$^{68}$Ga]DOTA-nanoHSA conjugates | | | | | | | |
|---|---|---|---|---|---|---|---|
| Product | RCP[a] | Particle Size by Intensity[a] | Particle Size Distribution | | | Polydispersity | Zeta Potential |
| Code | (%) | (nm) | d10 | d50 | d90 | Index[a] | (mV) |
| [$^{68}$Ga]JUB01 (n = 14) | 91 ± 7 | 32 ± 6 nm | 15-21 | 26-41 | 40-106 | 0.33 ± 0.08 | +16 |
| [$^{68}$Ga]JUB02 (n = 10) | 93 ± 4 | 72 ± 12 nm | 26-38 | 56-87 | 110-181 | 0.28 ± 0.04 | +16 |

[a]Results are expressed as mean ± standard deviation

Example 2. In Vitro Stability Study

The in vitro stability of the [$^{68}$Ga]DOTA-nanoHSA product [$^{68}$Ga]JUB01 was tested in mouse serum for up to four hours. An aliquot (50 μL) of [$^{68}$Ga]JUB01 was incubated with 450 μL of mouse serum at 37° C. with continuous shaking. RCP was performed by ITLC in triplicate at three hours and four hours of incubation. Stability results are depicted in Table X. [$^{68}$Ga]JUB01 is stable up to four hours in mouse serum at 37° C. with a RCP higher than 95%.

TABLE 2

| In vitro Stability of [$^{68}$Ga] JUB01 ([$^{68}$Ga]DOTA-nanoHSA, 32 nm) | | | |
|---|---|---|---|
| Product Code | Time Point (hours) | RCP of the product formulation (%) | RCP of the product in mouse serum[a] (% ) |
| [$^{68}$Ga]JUB01 (n = 3) | 3 | 98.1 | 96.8 ± 0.6 |
| [$^{68}$Ga]JUB01 (n = 3) | 4 | 98.5 | 95.8 ± 0.1 |

[a]Results are expressed as mean ± standard deviation

Example 3. In Vivo Imaging Studies

The in vivo biodistribution of [$^{68}$Ga]DOTA-nanoHSA products [$^{68}$Ga]JUB01 and [$^{68}$Ga]JUB02 having a mean particle size (as measured by a Zetasizer) of 32 nm and 72 nm, respectively, was evaluated by PET-CT and compared with the reference tracer, [$^{99m}$Tc]Sulfur Colloid, having a mean particle size of 13 nm (ultrafiltered) or 493 nm (not filtered), tested by SPECT-CT.

Female nude mice bearing a MDA-MB-435 tumor in the right mammary pad were injected intratumorally with 20 μL of [$^{68}$Ga]DOTA-nanoHSA products ([$^{68}$Ga]JUB01 and [$^{68}$Ga]JUB02, 0.7-2.5 MBq) or [$^{99m}$Tc]Sulfur Colloid reference tracers (ultrafiltered and not filtered, 3.6-7.0 MBq) (n=10 mice per tracer). In vivo imaging was performed between day 30 and 45 after tumor inoculation. Animals were placed in a prone position on a heated scanner bed, and the body temperature, respiratory and heart rates were monitored for the duration of the scan. Static (30-minutes) PET or SPECT scans were acquired at 30 minutes, three hours and five hours post tracer injection, followed by a 15-minutes-CT scan, using a Mediso nanoScan PET-CT or nanoScan SPECT-CT (Mediso Medical Imaging systems, Budapest, Hungary), respectively. Mice were anesthetized throughout the process (2% (v/v) isoflurane, 0.5 L/min medical air) through a nose cone.

PET and SPECT images were reconstructed using ordered subset expectation maximization (OSEM) algorithm, with corrections for scattered and random coincidences, dead time, attenuation, and isotope decay. Image analysis was performed with Amide software version 1.0.5, Stanford University. Regions of interest (ROIs) were drawn in the heart, lungs, liver, left kidney, muscle (hind left leg), tumor, axillary lymph nodes (AX LNs), and cervical lymph nodes (CV LNs) where applicable. The tracer activity in the ROIs was calculated as standardized uptake values (SUV) normalized to body weight, which allowed relative comparison between subjects.

Results of the imaging studies are depicted in FIG. 4. Better uptake and long retention of [$^{68}$Ga]DOTA-nanoHSA tracers, [$^{68}$Ga]JUB01 (32 nm) and [$^{68}$Ga]JUB02 (72 nm), in the sentinel AX LNs were observed with high contrast to surrounding tissues. [$^{68}$Ga]JUB01 (32 nm) displayed 2-fold higher uptake in AX LNs (SUV=8-11) compared to [$^{68}$Ga]JUB02 (72 nm, SUV=4-6) at three hours post tracer injection. The accumulation of $^{68}$Ga-labeled tracers in tumor and AX LNs was notably high even when utilizing less than half the activity of [$^{99m}$Tc]Sulfur Colloid. This suggests an enhanced imaging capability of the [$^{68}$Ga]DOTA-nanoHSA tracers. Uptake in AX LNs was confirmed by ex vivo biodistribution (refer to Example 3) and ex vivo imaging (refer to Example 4).

Higher diffusion from the tumor was observed with [$^{99m}$Tc]Sulphur Colloid as compared to [$^{68}$Ga]DOTA-nanoHSA tracers. The increased diffusion poses challenges in accurately delineating and detecting the AX LN region, and leads to tracer uptake in alternative LNs, such as cervical LNs, as detected with [$^{99m}$Tc]Sulphur Colloid but not with [$^{68}$Ga]DOTA-nanoHSA tracers.

Very high AX LN/organ SUV ratios (>10×) were found for both [$^{68}$Ga]DOTA-nanoHSA tracers, with no statistically significant differences ($\alpha$=0.05) when compared head-to-head with the current gold standard of lymphoscintigraphy, ultrafiltered [$^{99m}$Tc]Sulfur colloid, supporting the potential of the novel $^{68}$Ga-labeled tracers for sentinel lymph node (SLN) detection by PET.

The enhanced resolution and sensitivity of PET contribute to more precise localization and delineation of lymphatic structures. Therefore, the use of PET radiotracers is particularly pertinent when accurate anatomical localization is critical for clinical decision-making.

Example 4. Ex Vivo Biodistribution Studies

Ex vivo biodistribution was performed after the scan at three hours post tracer injection in a group of mice from Example 2 (n=5 per tracer).

At the end of the scan, Patent Blue dye solution (1% w/v in saline) was administered via the left and right fore footpads as well as the right hind footpad (20 μL each). The animals were sacrificed after 5 minutes post dye injection by blood extraction under anesthesia. The heart, lungs, liver, spleen, stomach, kidneys, intestines, muscle, tumor, as well as axillary (AX), left popliteal (PO) and iliac (IL) LNs were dissected, weighted and measured in a Wizard 2480 gamma counter (PerkinElmer Inc.). The uptake was calculated as the percentage of the injected dose (decay-corrected) per gram of tissue (% ID/g).

The results of the ex vivo biodistribution studies are reported in Table 2.

TABLE 3

Ex vivo biodistribution of [$^{68}$Ga]DOTA-nanoHSA products in comparison with [$^{99m}$Tc]Sulfur Colloid reference tracers

| Organ/Tissue | [$^{99m}$Tc]Sulfur Colloid Ultrafiltered (13 nm), % ID/g (n = 5) | [$^{99m}$Tc]Sulfur Colloid Unfiltered (493 nm), % ID/g (n = 5) | [$^{68}$Ga]JUB01 (32 nm), % ID/g (n = 7) | [$^{68}$Ga]JUB02 (72 nm, % ID/g (n = 8) |
|---|---|---|---|---|
| Blood | 0.10 ± 0.03 | 0.19 ± 0.11 | 2.72 ± 3.72 | 1.88 ± 2.05 |
| Heart | 0.08 ± 0.04 | 0.08 ± 0.02 | 0.97 ± 1.36 | 0.63 ± 0.65 |
| Lungs | 0.11 ± 0.04 | 0.20 ± 0.14 | 1.60 ± 2.15 | 1.16 ± 1.18 |
| Liver | 3.73 ± 3.48 | 3.27 ± 3.11 | 1.90 ± 1.60 | 1.96 ± 2.10 |
| Spleen | 2.07 ± 2.32 | 1.27 ± 1.25 | 1.22 ± 1.17 | 0.97 ± 0.94 |
| Stomach | 0.17 ± 0.06 | 0.29 ± 0.09 | 0.29 ± 0.24 | 0.44 ± 0.49 |
| Left Kidney | 6.82 ± 2.80 | 3.95 ± 1.32 | 9.30 ± 1.97 | 7.26 ± 2.04 |
| Right Kidney | 7.04 ± 2.94 | 4.13 ± 1.38 | 8.91 ± 3.99 | 7.61 ± 2.08 |
| Intestines | 0.20 ± 0.05 | 0.31 ± 0.13 | 1.94 ± 2.65 | 1.57 ± 1.59 |
| Muscle | 0.03 ± 0.01 | 0.03 ± 0.01 | 0.38 ± 0.50 | 0.30 ± 0.30 |
| Tumor | 160.30 ± 59.11 | 184.78 ± 68.47 | 425.92 ± 212.13 | 802.04 ± 679.60 |
| Axillary LN_LB | 0.14 ± 0.13 | 0.13 ± 0.05 | 1.22 ± 1.52 | 1.20 ± 1.22 |
| Axillary LN_LF | 0.57 ± 1.01 | 0.10 ± 0.03 | 1.09 ± 1.31 | 0.87 ± 0.77 |
| Axillary LN_RB | 102.24 ± 84.89 | 137.50 ± 154.35 | 149.38 ± 136.61 | 60.10 ± 49.01 |
| Axillary LN_RF | 184.12 ± 236.58 | 92.07 ± 164.68 | 240.82 ± 227.24 | 142.04 ± 194.83 |
| Popliteal LN_R | 0.42 ± 0.45 | 0.54 ± 0.85 | 0.98 ± 0.81 | 0.99 ± 0.75 |
| Iliac LN | 0.88 ± 1.24 | 0.34 ± 0.29 | 2.76 ± 1.58 | 1.54 ± 1.31 |

Results are expressed as mean ± standard deviation. R: Right side (Tumor side), L: Left side (contralateral side), B: back, F: Front Both [$^{68}$Ga]DOTA-nanoHSA tracers and [$^{99m}$Tc]Sulfur Colloid exhibited high SLNs (AX LNs) uptake. The $^{68}$Ga-labeled nanoconjugate with smaller particle size, [$^{68}$Ga]JUB01 (32 nm), displayed a higher uptake in the sentinel AX LNs than [$^{68}$Ga]JUB02 (72 nm). In contrast, the nanotracer with the larger particle size, [$^{68}$Ga]JUB02 (72 nm), demonstrated better retention in tumor compared to the conjugate with smaller particle size, [$^{68}$Ga]JUB01 (32 nm).

[$^{68}$Ga]DOTA-nanoHSA tracers exhibited very high SLN/organ ratios (>10×) in all tested organs, which correlates with SUV ratios results. These robust ratios suggest a pronounced and favorable accumulation of the tracers in sentinel lymph nodes, emphasizing their potential as highly effective imaging agents for lymphatic mapping and SLN detection in many kinds of cancer.

No statistically significant differences were observed in the SLN/organ ratios between the current gold standard of lymphoscintigraphy, ultrafiltered [$^{99m}$Tc]Sulfur colloid, and the newly developed [$^{68}$Ga]DOTA-nanoHSA tracers ($\alpha$=0.05). This implies that the novel tracers match the performance of the established gold standard, further supporting their potential as reliable alternatives for lymphatic imaging using PET.

Example 5. Ex Vivo Imaging Studies

Ex vivo imaging was performed after the scan at five hours post tracer injection in a group of mice from Example 2 (n=5 per tracer).

At the end of the scan, Patent Blue dye solution (1% w/v in saline) was administered via the left and right fore footpads (20 μL each). The animals were sacrificed after 5 minutes post dye injection. Tumor and AX LNs were dissected and scanned for 15 minutes by CT, followed by static PET (two hours) or SPECT (one hour) scans.

Results of ex vivo imaging studies are depicted in FIG. 5. The uptake and long retention (up to five hours post injection) of [$^{68}$Ga]DOTA-nanoHSA and [$^{99m}$Tc]Sulfur Colloid tracers in the SLNs (AX LNs on the tumor side) was confirmed by ex vivo images. No uptake was observed in the AX LNs on the contralateral side. These findings further demonstrate the suitability of the novel [$^{68}$Ga]DOTA-nanoHSA tracers for lymphatic PET imaging.

Example 6. Characterization of the Radiolabeled DOTA-nanoHSA-Folate Conjugates

The folate-derivative conjugate was prepared according to the synthesis scheme depicted in FIG. 2, where nanoHSA refers to a nanoparticle preparation having a mean particle size of 22±5 nm (n=3). The structure of the folate-derivative conjugate code named as JUB-03 is depicted in FIG. 2. After labeling the conjugate compound with Gallium-68, Technetium-99m, or Lutetium-177, the radiolabeled DOTAnanoHSA-folate products, [$^{68}$Ga]JUB03, [$^{99m}$Tc]JUB03, and [$^{177}$Lu]JUB03 were subjected to various characterization tests such as particle size distribution and polydispersity index (PI) using a Malvern Zetasizer. The Radiochemical purity (RCP) was determined by Radio-Instant Thin Layer Chromatography (ITLC) method. The results are shown in Table 3.

The main impurity is the free radioisotope in each case ([$^{68}$Ga]$Ga^{3+}$, [$^{177}$Lu]$Lu^{3+}$ and [$^{99m}$Tc]$TcO_4^-$). The impurity should be less than 10%. It should be understood that impurity level is based on the amount of radioisotope labeled on the conjugate, e.g., the activity.

The feasibility of labeling DOTA-nanoHSA-folate with Gallium-68, Technetium-99m, and Lutetium-177 was demonstrated with RCP values higher or equal to 97%. The particle size of the labeled conjugates [$^{68}$Ga]JUB03, [$^{99m}$Tc]JUB03, and [$^{177}$Lu]JUB03 were 29 nm, 42 nm, and 54 nm, respectively, with PI less than 0.4.

TABLE 4

Characterization of radiolabeled DOTA-nanoHSA-folate conjugates

| Product Code | RCP (%) | Particle Size by Intensity (nm) | Particle Size Distribution d10 | d50 | d90 | Polydispersity Index |
|---|---|---|---|---|---|---|
| [$^{68}$Ga]JUB03 | 97 | 29 | 18 | 30 | 42 | 0.3 |
| [$^{99m}$Tc]JUB03 | 100 | 42 | 18 | 37 | 109 | 0.3 |
| [$^{177}$Lu]JUB03 | 100 | 54 | 24 | 50 | 138 | 0.3 |

What is claimed:

1. A conjugate compound consisting of the formula:

$$H-(L)_i-(X)_m$$

wherein:

i) H is albumin;

ii) L is a chelating agent selected from the group consisting of 22,2',2",2"-(1,4,7,10-Tetraazacyclododecane-1,4,7,10-tetrayl)tetraacetic acid (DOTA), 2,2',2"-(1,4,7-triazacyclononane-1,4,7-triyl)triacetic acid (NOTA), trientine hydrochloride (TETA), 1,4-bis(carboxymethyl)-6-[bis(carboxymethyl)]amino-6-methylperhydro-1,4-diazepine) (AAZTA), Nitrilotriacetic acid (NTA), ethylenediaminetetraacetic acid (EDTA), 1,4,7,10-Tetraazacyclododecane-1,4,7-triacetic acid (DO3A), NOC, DOTAGA, and/or combinations thereof; and iii) X is a radioisotope selected from the group consisting of copper-64, copper-67, fluorine-18, gallium-68, gallium-67, gallium-66, lutetium-177, yttrium-86, yttrium-90, zirconium-89, bismuth-213, bismuth-212, actinium-225, astatine-211, gold-198, gold-199, lead-212, rhenium-188, rhenium-186, and/or combinations thereof; and wherein i is an integer of value 1-5 and m is an integer of 1-5; and wherein the said conjugate compound has a mean particle size distribution ($d_{50}$) of from about 25 nm to about 90 nm and the minimum particle size distribution ($d_{10}$) of the conjugate compound ranges from about 15 nm to about 40 nm and the maximum particle size distribution ($d_{90}$) of the conjugate compound ranges from about 40 nm to about 150 nm; and wherein the conjugate compound has a polydispersity index less than 0.5; and wherein the conjugate compound further consists of one or more target specific ligands conjugated to the albumin; and wherein the conjugate compound has an initial radiochemical purity of at least 95% immediately after preparation.

2. The conjugate compound according to claim 1, wherein the albumin is selected from the group consisting of human serum albumin (HSA), bovine serum albumin (BSA), recombinant albumin, recombinant human albumin, ovalbumin, alpha lactalbumin and/or combinations thereof.

3. The conjugate compound according to claim 1, wherein the conjugate compound has an initial radiochemical purity of at least 90% for at least 3 hours post labeling at room temperature after preparation.

4. A method of diagnosis and/or treatment of ovarian cancer, breast cancer, prostate cancer, thyroid cancer, neuroendocrine tumors (NETs), pancreatic cancer, non-small cell lung cancer (NSCLC), and/or combinations thereof comprising administering the conjugate compound according to claim 1.

5. A method of imaging sentinel lymph nodes comprising administering the conjugate compound according to claim 1 by PET or SPECT scans.

6. The conjugate compound according to claim 1, wherein L is 22,2',2",2"-(1,4,7,10-Tetraazacyclododecane-1,4,7,10-tetrayl)tetraacetic acid (DOTA) and X is selected from gallium-68 and lutetium-177.

* * * * *